(12) United States Patent
Odeh

(10) Patent No.: US 8,077,843 B2
(45) Date of Patent: Dec. 13, 2011

(54) SYSTEM AND METHOD IMPLEMENTING AN AUCTION GAME USING CELLULAR, MOBILE, LAND, SATELLITE, CABLE, AND INTERNET TELEPHONE NUMBERS

(76) Inventor: Zeid Abu Odeh, Amman (JO)

( * ) Notice: Subject to any disclaimer, the term of this patent is extended or adjusted under 35 U.S.C. 154(b) by 1402 days.

(21) Appl. No.: 11/519,328

(22) Filed: Sep. 11, 2006

(65) Prior Publication Data
US 2008/0077520 A1    Mar. 27, 2008

(51) Int. Cl.
*H04M 11/00* (2006.01)
(52) U.S. Cl. .................................. 379/93.13
(58) Field of Classification Search .............. 379/93.13; 463/41, 40, 16, 17, 18
See application file for complete search history.

(56) References Cited

U.S. PATENT DOCUMENTS

| | | | |
|---|---|---|---|
| 2004/0147319 A1* | 7/2004 | Aviyants | 463/40 |
| 2006/0258429 A1* | 11/2006 | Manning et al. | 463/16 |
| 2008/0058056 A1* | 3/2008 | Johnson | 463/17 |

* cited by examiner

*Primary Examiner* — Stella Woo
(74) *Attorney, Agent, or Firm* — Abelman, Frayne & Schwab

(57) ABSTRACT

A system and method effectively implement an auction game through telephones, which utilize cellular, mobile, land, satellite, cable, and Internet telephone numbers. Due to the fact of the impossibility of having one contact number for different mobile owners, the probability of confusion regarding the identity of the first winner or winners in the auction game becomes nearly nonexistent. The cellular user sends a short message to a specific telephone number to input a number to outbid or to offer more than a selected number which consists of one digit at a predetermined time beforehand and at a price which the user finds suitable. The selected number consists of one digit which is part of an operating mobile number. The auction game is managed through a specific telecommunication network or through a number of networks in agreement between the networks and the organizer of the auction game.

10 Claims, 2 Drawing Sheets

# SYSTEM AND METHOD IMPLEMENTING AN AUCTION GAME USING CELLULAR, MOBILE, LAND, SATELLITE, CABLE, AND INTERNET TELEPHONE NUMBERS

BACKGROUND OF THE INVENTION

1. Field of the Invention

This invention relates to gaming, and in particular to an electronic system and method implementing an auction game using cellular, mobile, land, satellite, cable, and Internet telephone numbers.

2. Description of the Related Art

Cellular phones, or cell phones, have become an important tool in daily life, through which one can communicate with people, send them messages, renew subscriptions, pay different bills, as well as play a variety of games.

It is difficult to conduct some games electronically using cellular phones, such as active auctions conducted in real time. Such auction-based games may be very attractive to game players, for example, to win expensive prizes.

A need exists for a cellular-phone-based system and method which facilitate conducting auction-based games in real time.

Typically, auctions and auction-based games require unique identification of the winners to award the prizes. However, with large numbers of game players, there is a high probability of confusion regarding the identity of the first winner or winners of auction-based games. For example, different game players may share the same name such as "John Smith".

A need exists for a cellular-phone-based system and method which uniquely identify the winners with no confusion regarding the identity of the first winner or winners.

BRIEF SUMMARY OF THE INVENTION

A system and method effectively implement an auction game through telephones, which utilize cellular, mobile, land, satellite, cable, and Internet telephone numbers. Due to the fact of the impossibility of having one contact number for different mobile owners, the probability of any kind of confusion regarding the identity of the first winner or winners in the auction game becomes nearly nonexistent.

The cellular user sends a short message to a specific telephone number in which the user inputs a number to outbid or to offer more than a selected number which consists of one digit at a predetermined time beforehand and at a price which the user finds suitable. The selected number consists of one digit which is part of an operating mobile number. The auction game is managed through a specific telecommunication network or through a number of different networks in agreement between the networks and the organizer of the auction game.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
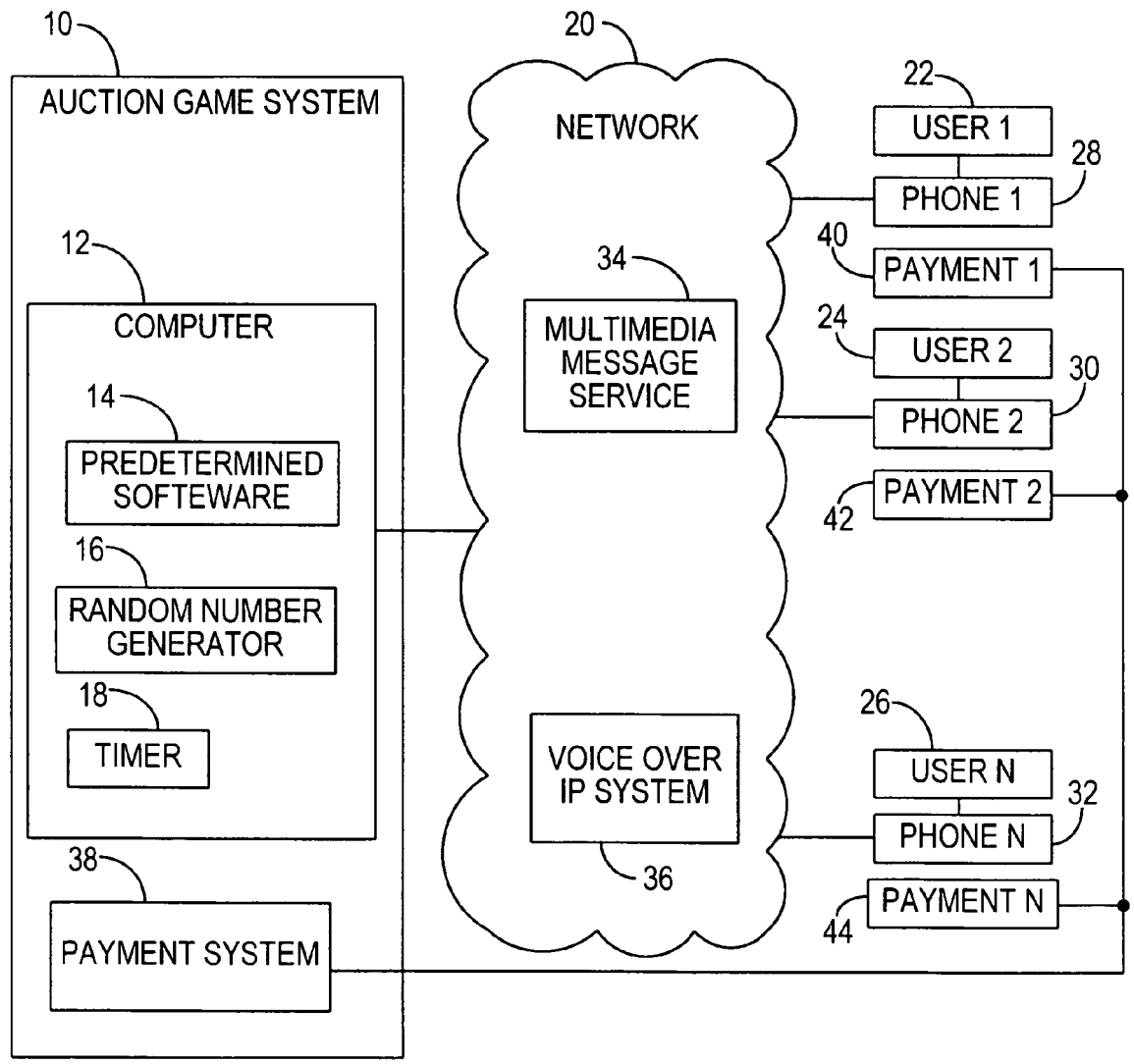
FIG. 1 is a schematic of the system implementing the present invention.
Figure 2:
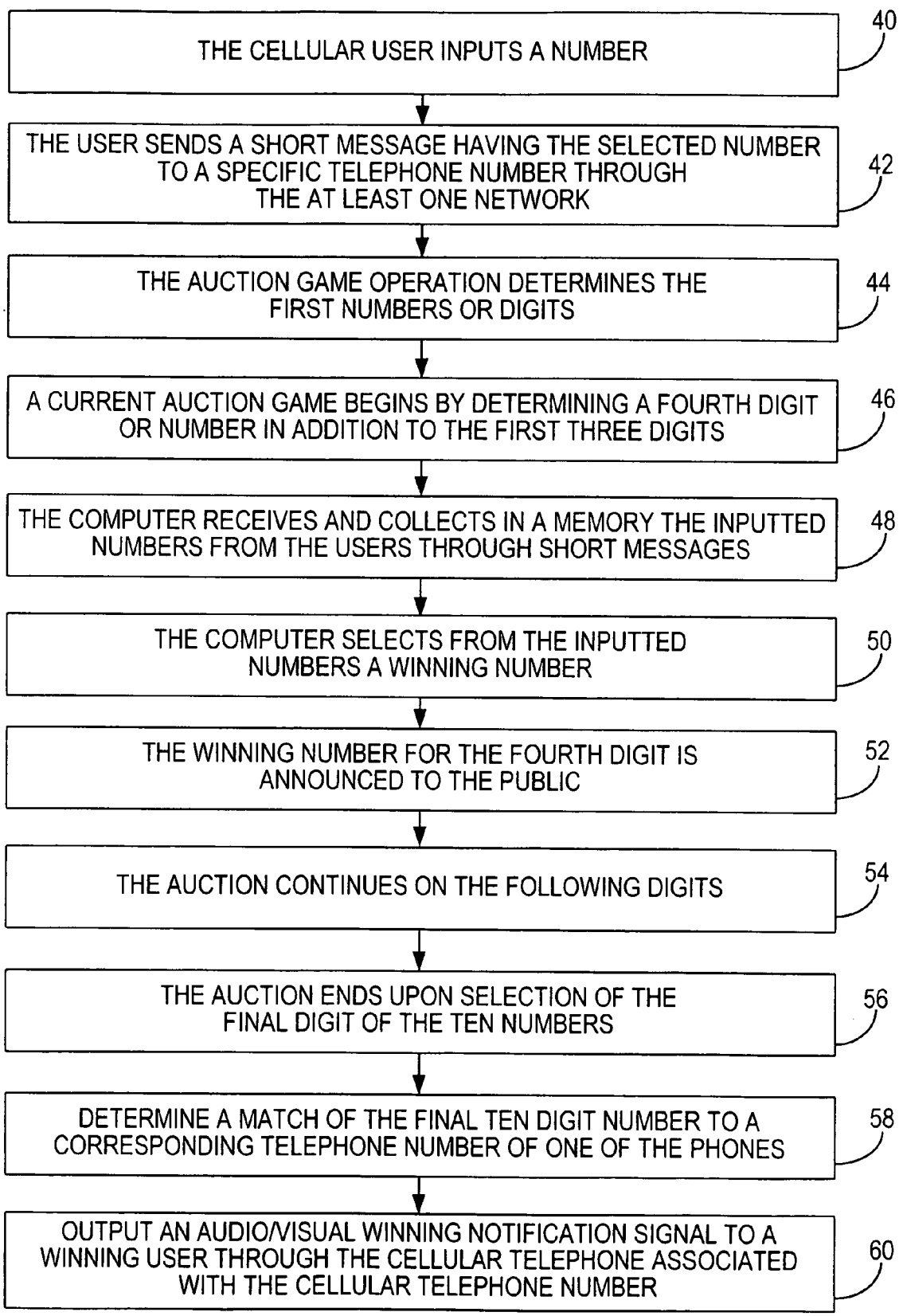
FIG. 2 is a flowchart of the method of operation of the present invention.

As shown in FIGS. 1-2, a system and method effectively implement an auction game through telephones, which utilize cellular, mobile, land, satellite, cable, and Internet telephone numbers.

As shown in FIG. 1, the auction game system 10 of the present invention includes a computer 12, such as a server, having a memory and which operates predetermined software 14 in conjunction with a random number generator 16 and a timer 18 for conducting the auction through at least one network 20 with a plurality of users 22-26, with each user 22-26 having access to a telephone device 28-32, respectively, such as a cellular telephone or cell phone, a mobile telephone, a land-based telephone, a satellite-based telephone, a cable-based telephone, and/or an Internet-based telephone, for connecting to the at least one network 20. The users 22-26 may be subscribers to the at least one network, such as a telecommunications provider, or the users 22-26 may be subscribers to an auction gaming group maintained by the auction game system 10.

The at least one network 20 may include any known types of telecommunication networks, such as a telephone network, the Internet, and/or interconnected computer networks. The at least one network 20 may also include a multimedia message service (MMS) 34 for conveying MMS messages from the phones 28-32 of the users 22-26 to the auction game system 10 through the at least one network 20. In alternative embodiments, the MMS 34 may include or may be replaced by a short message service (SMS). Accordingly, it is understood herein that either or both an MMS and/or an SMS may be used for sending MMS and/or SMS messages between the phones 28-32 and the auction game system 10.

In addition, the at least one network 20 may also include a Voice Over Internet Protocol (VOIP) system 36 for conveying voice messages from the phones 28-32 of the users 22-24 to the auction game system 10 through the at least one network 20, in which the phones 28-32 of the users 22-24 include computing devices connected to the at least one network and having VoIP capabilities to act as a telephone device. Such computing devices with VOIP capabilities may include personal computers, laptops, personal digital assistants, and web phones.

The computer 12 may include or may be connected to a payment system 38 which receives payments and/or payment instructions from the users 22-26 through the at least one network 20 and/or through other known payment methods. The payment system 38 may also be capable of distributing cash prizes or credit amounts to winners of the auction game.

In an example embodiment of operation of the present invention, as shown in FIG. 2, the method of operation of the present invention, using the components shown in FIG. 1, includes having the cellular user, such as user 22, input a number in step 40 to outbid or to offer more than a selected number which consists of one digit at a predetermined time beforehand and at a price which the user 22 finds suitable. In order to outbid, the user 22 must accept being charged a price for the privilege and opportunity to outbid others for the selected number.

For example, to win the auction, the user 22 must match the telephone number associated with the user 22 and with the telephone 28, and so the user 22 knows the digits which the user 22 must bid on in order to match each digit in the winning telephone number. Therefore, for example, to outbid others for the fourth digit being a "7", being the fourth digit in the telephone number of the user 22, the user 22 must pay a higher price than others. Similarly, for later digits such as the fifth digit, the user 22 must in turn pay to outbid others for such a fifth digit to be "3", being the fifth digit in the telephone number of the user 22, and so on.

Having input the selected number and expecting to be charged a price for outbidding for the selected number, the user 22 then sends a short message including the selected number to a specific telephone number through the at least one network 20 in step 42. The selected number consists of one digit which is part of an operating mobile number. By sending a short message including the selected number to the computer 12, the user 22 agrees to pay the necessary prices, up to a maximum price determined by the user 22, to outbid others and keep the right to the selected number as the specific digit in the Nth position in the winning telephone number.

In one embodiment, the user may place a value for a certain amount of money a message sent via the MMS 34 and/or an SMS as the amount which the user wants to outbid in the auction for a specific number. In an alternative embodiment, another way to bid in the auction is by simply selecting the number the user wants to bid on, with the selected number sent in an SMS message and/or an MMS message, without indicating any amount of money. A predetermined percentage of sending SMS or MMS costs may be directed to a pool where all the total money accruing from the predetermined percentage money generated from users sending in their bids would be a determining factor to choose the winning number for each stage, for example, the Nth digit.

The auction game is managed through the at least one network 20 having a specific telecommunication network or through a number of different networks in agreement between the networks and the organizer of the auction game operation of the auction game system 10. For telephone numbers, the number of calling number digits in a certain country may be ten, for example, without taking this number as a determiner for a game, but in which the same description may be applied to any number of digits to any telecommunication network and in any country.

The auction organizer, administrator, and/or the operator, who may licensed to manage the auction game and who operates the auction game system 10, determines the first numbers or digits in step 44, for example, using the predetermined software 14. For example, the organizer may use the random number generator 16 to choose, for instance, the first three digits associated with the auction on a specific network of the at least one network 20. For example, the specific network may be designated the XYZ network from among a plurality of networks. The chosen number may be, for example, 079, and the current auction game begins in step 46 starting with determining a fourth digit or number in addition to the first three digits 079. Accordingly, the auction starts for all the network users 22-26 on the XYZ network selecting the next digit on the number scale ranging from zero to nine.

The computer 12 then receives and collects in a memory the inputted numbers from the users through the MMS short messages in step 48, and selects from the inputted numbers a winning number in step 50, for example, a number which the users 22-26 bid on the highest amount of money within the time limit determined by the game organizer, for example, by the computer 12 using the timer 18, for generating the fourth digit.

The winning number for the fourth digit is announced to the public in step 52 after the winning number is set, for example, by messages, such as text messages through the MMS 34, with such text messages including the winning number which are sent from the computer 12 over the network 20 to each of the phones 28-32. The auction continues on the following digits in step 54 until the auction reaches a final stage in which the final digit of the ten numbers competed on by the users 22-26 is selected in step 56.

The final ten digit number determines the user from the plurality of users 22-26, with the winning user having the complete ten digit number associated with the phones 28-32. If the computer 12, using the predetermined software 14, determines a match in step 58 of the final ten digit number to a corresponding telephone number of one of the phones 28-32, the auction game system 10 outputs an audio/visual winning notification signal to a winning user though the cellular telephone associated with the cellular telephone number corresponding to the final ten digit number in step 60.

In addition, the auction game system 10 may reward the winning user, for example, through a payment distributed by the payment system 38.

The determined prizes in this game are the money collected from bidding on all digits and on all numbers in the seven stages of the auction. In an example embodiment, the first winner wins all the auction money.

There may also be cash prizes or in kind prizes for supplemental winners, such a consolation prizes for those user having telephone numbers associated with their phones 28-32 which match the first two places, first three places, first four places, first five places, etc. of the winning ten digit number. The number of winners may also be increased depending on the desire of the game organizer operating the auction game system 10.

In various embodiments, passing through the game at different stages may not entail a decrease in the number of subscribers. Some of the subscribers may be able to vote on certain numbers for the reason of finding similarity between these numbers and those of their friends or relatives or just for the challenge itself.

A multi-level game may be arranged at the same time in a way that heightens the level of challenge. For example, the game may arranged in a way that the game includes a number determined according to the specified digits of the targeted telecommunication network or networks in a certain country or among different countries, either at the same time and at the same game or at different times and in different games. Also, the bidding process may be performed separately on specific digits for each number according to the network and on different numbers. In addition, a multi-leveled game may begin and end at the same point. Upon outbidding on each digit, the number level may be raised or lowered from one point to another depending on the increase or decrease of the sums of bid money for the targeted digits.

In a further embodiment, the number of the bidding process determined such that the sums of money for the digits in the different stages collect more money than the bidding sums of the other numbers within the same game is the number to be raised to the first level. Accordingly, the final sum at the end of the game after determining the winning number is the highest number won within the game levels, which is then followed by the number won by less money and so on.

In another embodiment, the digits numbers of the numerals in the multi-leveled game must be equal in order to ensure the transition from one stage to another simultaneously.

The organizer has the right to determine the rules of the game in addition to determining who is allowed to participate in it. Such rules are implemented by the predetermined software 14 executed by the computer 12 performing the auction games with the users 22-26 through their phones 28-32.

Regarding the cost, the game may consist of two parts: the cost of participation, and the overbidding amount. The cost of participation is an operating cost for sending each bid from the cellular phone 28 of the user 22, for example, through the MMS 24 which is determined by a specific amount of money. The resulting revenue from the cost of these messages is distributed thereafter between the at least one network 20, such as telecommunication network, an information management network, such as the operator of the computer 12 and/or the payment system 38, and the game organizer.

The overbidding amount is determined by the participant by writing the amount of money in a certain way in the message send through the MMS 24. The money from the overbidding amount may be deducted, for example, by deducting the money instantly from the account of pre-paid charge cards associated with each participant in the auction. In the event that the bidding amount is more than the amount in the account of the pre-paid charge card, then all that money is taken and thus is considered to be the amount of bidding.

In another example of deducting the overbidding amount, the bidding amount may be added to a regular subscription bill of the subscriber participating in an auction. If the subscriber is one of the bill subscribers, the payment system 38 may ensure that the subscriber cannot collect any prize unless all the bills of the bidding amounts are first paid off.

In a further example of deducting the overbidding amount, such deductions may be made through a user buying special scratch cards, with a secret number stated on the card when scratched such that user sends the secret number to the auction game, and so the specific amount of money on the card corresponding to the secret number is added to the auction money on the number chosen by the participant. A certain percentage is then calculated from the bidding amounts for the interest of the telecommunication network, the information management network, and the game organizer.

Applications of sponsorships, subsidizations and contributions of different companies and enterprises may be accepted so that such entities may offer cash or in kind prizes for the winners. Such affiliations with companies or enterprises may be conducted in various ways. For example, an auction game may be held under the sponsorship of at least one sponsor in return for paying a certain amount of money for the benefit of the game organizer. Alternatively, the auction game is supported by at least one supporter of a company or enterprise in return of a certain amount of money for the benefit of the game organizer. In addition, second level sponsoring of an auction game by at least one sponsor may be conducted upon payment of a small amount of money in addition to offering material or in kind prizes to the first winner or to subsequent runner-up winners.

The names of the sponsors, supporters and second level sponsors may added on to advertisements and fliers of each auction game on different levels and according to the level of participation of each sponsor, supporter, and second level sponsor.

The number of participants in an auction game is not necessarily specified or limited to a certain limit or amount of money. It is also noteworthy to mention that the auction game organizer may limit participation to auction games unless a participant provides some money coverage of the bidding amount.

All telecommunication mediators and entities may be used in order to execute and manage the auction games. For example, telecommunication networks may cellular, mobile, land-based, satellite-based, cable-based, and Internet-based.

In additional alternative embodiments, the auction game system 10 and/or the at least one network 20 may include an automatic answering system through which participants in an auction game may call a certain number to know the amounts of money for the numbers under the bidding process regarding the digit under bidding. This could be done through sending an MMS message and/or calling a certain telephone number.

In another alternative embodiment, due to the fact that mobile, cellular, land phones, and other types of telephones and communication devices may be used by other individuals instead of the owner of such communication devices for various reasons, and to avoid any misconduct by any party who may have access to the communication devices, in an alternative embodiment, the system and method of the present invention are implemented such that, once the user participates for the first time in an auction, the user is granted an identification code which is to be used in future participations in the auctions. Such user-specific identification codes guarantees that the owner of the communication device, such as a mobile phone, cellular phone, or land phone, is the person who is actually participating in the auction.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. An auction-based game system comprising:
   a computer, connected to at least one network and operating predetermined software, for:
   (i) selecting a plurality of users for participating in an auction-based game, each user having a telephone with a unique telephone number, and wherein each telephone number has the same number of digits;
   (ii) inviting bids from the selected users to determine a first digit of a set of numbers;
   (iii) receiving bid data from said selected users, transmitted over the at least one network, for determining the first digit in the set of numbers; then
   (iv) inviting bid data from a plurality of said selected users on an additional digit for the set of numbers, and receiving bid data from said users for determining said additional digit;
   (v) continuing to invite bid data from a plurality of selected users, and receiving additional bid data, until the number of digits determined reaches the number of digits in the telephone numbers of the selected users;
   (vi) selecting a winner of the auction-based game using the predetermined software implementing predetermined rules and the winning number, and
   (vii) generating and outputting an audio and/or visual winner-notification message to each of the telephone devices to notify at least one of the users of the winner of the auction-based game.

2. The auction-based system of claim 1, wherein the winning number is in the format of a telephone number, with the winning number matching a telephone number associated with one of the selected users.

3. The auction-based game system of claim 1, wherein at least one of the plurality of telephone devices is a cellular telephone; and
   wherein the winning number matches a respective cellular telephone number associated with the cellular telephone corresponding to one of the plurality of users.

4. The auction-based game system of claim 1, wherein the plurality of telephone devices is selected from the group consisting of: a cellular telephone, a mobile telephone, a land-based telephone, a satellite-based telephone, a cable-based telephone, and an Internet-based telephone.

5. The auction-based game system of claim 1, wherein the at least one network includes a plurality of telecommunication networks; and wherein the computer conducts the auction-based game across a plurality of telecommunication networks.

6. The auction-based game system of claim 1, wherein the at least one network connects the computer to the plurality of users in a plurality of states; and wherein the computer conducts the auction-based game across the plurality of states.

7. The auction-based game system of claim 1, wherein the at least one network connects the computer to the plurality of users in a plurality of countries; and wherein the computer conducts the auction-based game across the plurality of countries.

8. The auction-based game system of claim 1, wherein the computer conducts the auction-based game with a plurality of game levels.

9. The auction-based game system of claim 1, further comprising:

a Voice Over Internet Protocol (VoIP) system connecting the computer to a VoIP computing device included in plurality of telephone devices to receive bid data from a user using the VoIP computing device.

10. A method for conducting a cellular-telephone-based auction game, the method comprising the steps of:

inputting a plurality of selected numbers by a plurality of cellular telephone users into a plurality of cellular telephones respectively associated with the plurality of cellular telephone users;

sending short messages having the selected numbers from the plurality of cellular telephones to a specific telephone number through at least one network to a computer;

operating predetermined software at the computer to determine a first number having three digits;

beginning a current auction game by determining a fourth digit in addition to the first three digits;

receiving the inputted plurality of selected numbers in the short messages from the plurality of cellular telephone users;

selecting a winning number from the inputted plurality of selected numbers;

publicly announcing the winning number to the plurality of cellular telephone users;

continuing the auction game to select additional digits;

ending the auction game upon selection of a final tenth digit;

determining a match of the final ten digit number to a corresponding cellular telephone number of one of the plurality of cellular telephones; and outputting an audio/visual winning notification signal to a winning user though the cellular telephone associated with the cellular telephone number corresponding to the final ten digit number.

* * * * *